United States Patent
Tang et al.

(10) Patent No.: US 9,441,152 B2
(45) Date of Patent: Sep. 13, 2016

(54) WELLBORE SERVICING COMPOSITIONS AND METHODS OF MAKING AND USING SAME

(71) Applicant: Halliburton Energy Services, Inc., Houston, TX (US)

(72) Inventors: Tingji Tang, Spring, TX (US); Feng Liang, Cypress, TX (US)

(73) Assignee: Halliburton Energy Services, Inc., Houston, TX (US)

(*) Notice: Subject to any disclaimer, the term of this patent is extended or adjusted under 35 U.S.C. 154(b) by 427 days.

(21) Appl. No.: 13/909,533

(22) Filed: Jun. 4, 2013

(65) Prior Publication Data

US 2014/0357535 A1 Dec. 4, 2014

(51) Int. Cl.
*C09K 8/80* (2006.01)
*C09K 8/68* (2006.01)
*C09K 8/575* (2006.01)
*C09K 8/88* (2006.01)
*C09K 8/508* (2006.01)

(52) U.S. Cl.
CPC ............. *C09K 8/805* (2013.01); *C09K 8/5086* (2013.01); *C09K 8/5755* (2013.01); *C09K 8/68* (2013.01); *C09K 8/885* (2013.01)

(58) Field of Classification Search
None
See application file for complete search history.

(56) References Cited

U.S. PATENT DOCUMENTS

| | | | |
|---|---|---|---|
| 4,042,032 A | 8/1977 | Anderson et al. | |
| 4,101,474 A | 7/1978 | Copeland et al. | |
| 4,218,360 A | 8/1980 | Burhans et al. | |
| 5,486,557 A | 1/1996 | Akerberg | |
| 6,174,967 B1 | 1/2001 | Soucek et al. | |
| 6,881,708 B2 | 4/2005 | Reddy et al. | |
| 7,114,570 B2 | 10/2006 | Nguyen et al. | |
| 7,153,575 B2 | 12/2006 | Anderson et al. | |
| 7,306,037 B2 | 12/2007 | Nguyen et al. | |
| 7,407,010 B2 | 8/2008 | Rickman et al. | |
| 8,183,186 B2 | 5/2012 | Luo et al. | |
| 2005/0089631 A1* | 4/2005 | Nguyen | B01J 2/006 427/212 |
| 2005/0145385 A1* | 7/2005 | Nguyen | C09K 8/68 166/279 |
| 2010/0282465 A1 | 11/2010 | Weaver et al. | |

FOREIGN PATENT DOCUMENTS

EP 0903461 A1 3/1999
WO 8000847 A1 5/1980

OTHER PUBLICATIONS

Foreign communication from a related counterpart application—International Search Report and Written Opinion, PCT/US2014/039926, Sep. 11, 2014, 12 pages.

* cited by examiner

*Primary Examiner* — John J Figueroa
(74) *Attorney, Agent, or Firm* — Craig W. Roddy; Baker Botts L.L.P.

(57) ABSTRACT

A method of servicing a wellbore in a subterranean formation comprising preparing a wellbore servicing fluid comprising a resin material, a silane coupling agent, and an aqueous base fluid, placing the wellbore servicing fluid in the wellbore and/or subterranean formation, and allowing the wellbore servicing fluid to harden therein.

18 Claims, 2 Drawing Sheets

WELLBORE SERVICING COMPOSITIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates to methods of servicing a wellbore. More specifically, it relates to methods of treating a wellbore with resin compositions.

Natural resources (e.g., oil or gas) residing in a subterranean formation may be recovered by driving resources from the formation into a wellbore using, for example, a pressure gradient that exists between the formation and the wellbore, the force of gravity, displacement of the resources from the formation using a pump or the force of another fluid injected into the well or an adjacent well. The production of fluid in the formation may be increased by hydraulically fracturing the formation. That is, a viscous fracturing fluid may be pumped down the wellbore at a rate and a pressure sufficient to form fractures that extend into the formation, providing additional pathways through which the oil or gas can flow to the well.

To maintain the fractures open when the fracturing pressures are removed, a propping agent (i.e., a proppant) may be used. Proppant packs are typically introduced into the wellbore and surrounding formation during fracturing and completion operations in order to provide a structural frame for both downhole support and fluid collection, e.g., consolidate the wellbore and/or subterranean formation. In some instances, the proppants may be coated with resins (i.e., resin coated proppants) that facilitate the proppant particle's adherence to each other and to the wellbore and/or subterranean formation surface. However, while delivering a resin-coated proppant into the wellbore, the proppant particles may stick to the equipment, prior to reaching their desired location. Thus, an ongoing need exists for more effective compositions and methods of delivering resins and proppants in subterranean formations.

SUMMARY

Disclosed herein is a method of servicing a wellbore in a subterranean formation comprising preparing a wellbore servicing fluid comprising a resin material, a silane coupling agent, and an aqueous base fluid, placing the wellbore servicing fluid in the wellbore and/or subterranean formation, and allowing the wellbore servicing fluid to harden therein.

Also disclosed herein is a method of servicing a wellbore in a subterranean formation comprising preparing a wellbore servicing fluid comprising a resin material, a silane coupling agent, and an aqueous base fluid, wherein the resin material comprises an epoxy-based resin, the silane coupling agent comprises an amino silane, and the aqueous base fluid comprises a brine, placing the wellbore servicing fluid in the wellbore and/or subterranean formation, and allowing the wellbore servicing fluid to harden therein, thereby forming a hybrid polysilicone-resin system.

Further disclosed herein is a method of servicing a wellbore in a subterranean formation comprising preparing a wellbore servicing fluid comprising a resin system, an aqueous base fluid, and a particulate material, wherein the resin system consists essentially of a resin material and a silane coupling agent, and placing the wellbore servicing fluid in the wellbore and/or subterranean formation.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
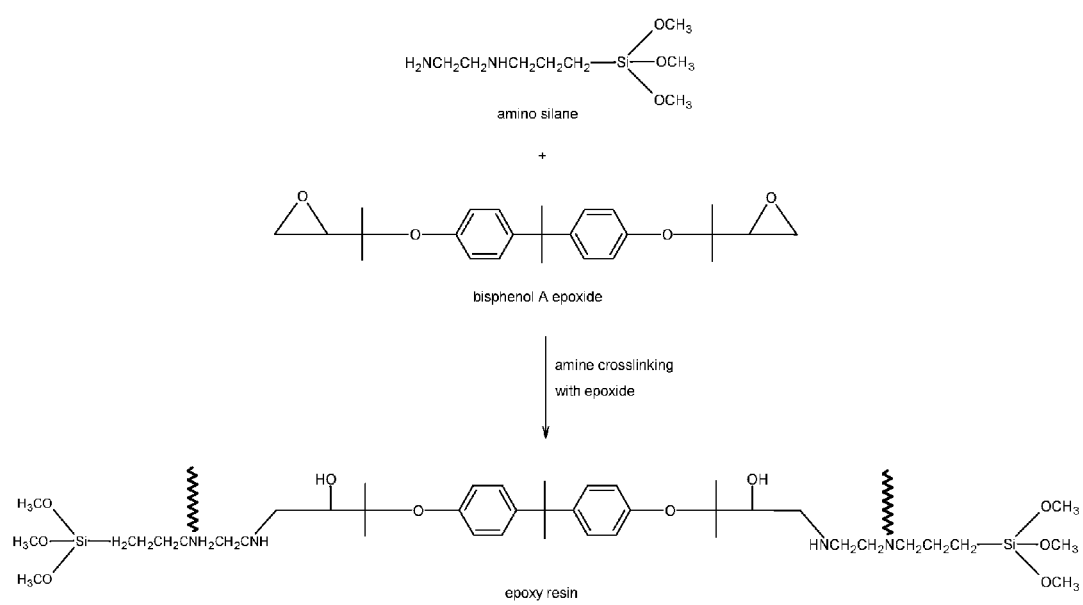
FIG. 1 is a schematic representation of a reaction between a silane coupling agent and a resin material.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing fluids or compositions (collectively referred to herein as WSFs) and methods of using same. In an embodiment, the wellbore servicing fluid may comprise a resin material, a silane coupling agent, and a sufficient amount of an aqueous base fluid to form a pumpable WSF. In an embodiment, the wellbore servicing fluid may be placed (e.g., pumped) in the wellbore and/or subterranean formation, where it may be allowed to harden, thereby consolidating at least a portion of a wellbore and/or subterranean formation.

In an embodiment, the WSF comprises a resin material. As used herein, the term "resin material" refers to any of a number of physically similar polymerized synthetics or chemically modified natural resins including thermoplastic materials and thermosetting materials. For example, the resin material may comprise a liquid-hardenable resin. In an embodiment, the liquid-hardenable resin comprises a hardenable resin and an optional solvent.

In an embodiment, the liquid-hardenable resin comprises a hardenable resin. Nonlimiting examples of hardenable resins suitable for use in this disclosure include organic resins, epoxy-based resins, polyepoxide resins, cycloaliphatic epoxides, bis(3,4-epoxycyclohexyl-methyl)oxalate, bis(3,4-epoxycyclohexylmethyl)adipate, bis(3,4-epoxy-6-methylcyclohexyl-methyl)adipate, bis(3,4-epoxycyclohexylmethyl)pimelate, 3,4-epoxycyclohexylmethyl-3,4-epoxycyclohexane carboxylate, 3,4-epoxy-1-methylcyclohexylmethyl-3,4-epoxycyclohexane carboxylate, 3,4-epoxy-1-methylcyclohexylmethyl-3,4-epoxy-1-methylcyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, 2-(3,4-epoxycyclohexyl-5,5-spiro-3,4-epoxy)cyclohexane-meta-dioxane, glycidyl epoxides, aliphatic epoxides, epoxy cresol novolac resins, epoxy phenol novolac resins, polynuclear phenol glycidyl ether-derived resins, aromatic glycidyl amine resins, heterocyclic glycidyl amine resins, hydantoin epoxy resins, natural oils epoxides, soybean oil epoxides, linseed oil epoxides, bisphenol A diglycidyl ether resin, butoxymethyl butyl glycidyl ether resin, bisphenol A-epichlorohydrin resin, bisphenol F resin, bisphenol epoxy resin, phenolic resins, phenolic/latex resins, terpolymers of phenol, phenol-aldehyde resins, novolac resins, phenolic formaldehyde resin, urea-aldehyde resin, urea-formaldehyde resin, melamine-formaldehyde resin, furan resins, furan/formaldehydyde resin, furfuryl alcohol resins, furfuryl alcohol/formaldehyde resin, phenol/phenol formaldehyde/furfuryl alcohol resin, bisphenol A epoxide (i.e., the compound characterized by Structure I), and the like, or combinations thereof.

Structure I

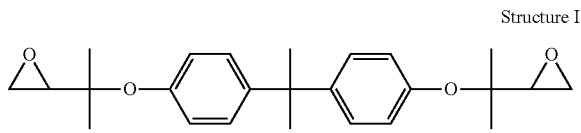 [SMILES: CC(C)(c1ccc(OC(C)(C)C2CO2)cc1)c1ccc(OC(C)(C)C2CO2)cc1]

Resins suitable for use in this disclosure are described in more detail in U.S. Pat. Nos. 5,486,557; 6,174,967; 6,881,708; 7,114,570; 7,153,575; 7,306,037; and 7,407,010; each of which is incorporated by reference herein in its entirety.

In an embodiment, the hardenable resin may be included in the liquid-hardenable resin in any suitable amount. In an embodiment, a hardenable resin of the type disclosed herein may be present in the liquid-hardenable resin in an amount of from about 5 wt. % to about 95 wt. %, alternatively from about 15 wt. % to about 85 wt. %, or alternatively from about 25 wt. % to about 55 wt. %, based on the weight of the liquid-hardenable resin component.

In an embodiment, the liquid-hardenable resin comprises a solvent. The use of a solvent in the liquid-hardenable resin is optional. It is within the ability of one skilled in the art with the benefit of this disclosure to determine if and how much solvent may be needed to achieve a viscosity to meet some user and/or process goal. In an alternative embodiment, the hardenable resin may be heated to reduce its viscosity.

In an embodiment, any solvent that is compatible with the hardenable resin and achieves the desired viscosity may be suitable for use in the liquid-hardenable resin. Selection of an appropriate solvent is dependent on the resin composition chosen and is within the ability of one skilled in the art with the benefit of this disclosure.

Nonlimiting examples of solvents suitable for use in this disclosure include aqueous dissolvable solvents, methanol, isopropanol, butanol, butyl lactate, butyl acetate, glycol ether solvents, dipropylene glycol methyl ether, dipropylene glycol dimethyl ether, diethylene glycol methyl ether, ethyleneglycol butyl ether, diethyleneglycol butyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, dimethyl formamide, propylene carbonate, D-limonene, furfuryl acetate, tetrahydrofurfuryl methacrylate, tetrahydrofurfuryl acrylate, esters of oxalic, maleic and succinic acids, fatty acid methyl esters, butylglycidyl ether, isomers thereof, and the like, or combinations thereof.

In an embodiment, the solvent may be included in the liquid-hardenable resin in any suitable amount. In an embodiment, a solvent of the type disclosed herein may be present in the liquid-hardenable resin in an amount of from about 0.1 wt. % to about 80 wt. %, alternatively from about 1 wt. % to about 50 wt. %, or alternatively from about 5 wt. % to about 30 wt. %, based on the weight of the liquid-hardenable resin.

In an embodiment, the resin material may be included within the WSF in any suitable amount. In an embodiment, a resin material of the type disclosed herein may be present within the WSF in an amount of from about 0.01 wt. % to about 10 wt. %, alternatively from about 0.1 wt. % to about 5 wt. %, or alternatively from about 0.5 wt. % to about 2 wt. %, based on the total weight of the WSF.

In an embodiment, the WSF comprises a silane coupling agent. In an embodiment, the silane coupling agent is a multifunctional compound comprising two or more reactive moieties that can form covalent bonds with other molecules. Alternatively, in an embodiment, the silane coupling agent is a bifunctional compound comprising two reactive moieties that can form covalent bonds with other molecules. In an embodiment, a silane coupling agent suitable for use in the present disclosure is able to covalently bond to both a substrate surface (e.g., a surface of a proppant, a formation surface, a wellbore surface, etc.) and to a resin material under the conditions present in the wellbore and/or subterranean formation. For example the silane coupling agent may be reactive at wellbore temperatures ranging from about 65° F. to about 500° F., alternatively from about 100° F. to about 350° F., or alternatively from about 125° F. to about 250° F.

In an embodiment, the silane coupling agent comprises the product of a condensation reaction between an amine-based coupling agent precursor and a silane-based coupling agent precursor; an amino silane, N-(3-triethoxysilylpropyl)amine, 3-aminopropylsilanetriol, bis[(3-triethoxysilyl)propyl]amine, N-(3-trimethoxysilylpropyl)amine, bis[(3-trimethoxysilyl)propyl]-amine, N-(3-methyldimethoxysilylpropyl)amine, 3-methyldimethoxysilylpropylamine, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(3-trimethoxysilylpropyl)diethylenetriamine, N-(3-methyldimethoxysilylpropyl)diethylenetriamine, methyldimethoxysilylpropylpiperazine, N-3-(trimethoxysilyl)-propylcyclohexylamine, N-3-(methyldimethoxysilyl)-propylcyclohexylamine, N-(trimethoxysilylmethyl)aniline, N-(triethoxysilylmethyl)aniline, N-(3-trimethoxysilylpropyl)aniline, N-(3-triethoxysilylpropyl)aniline, diethylaminomethyltriethoxysilane, diethylaminomethylmethyldiethoxysilane, 3-(trimethoxysilylpropyl)diethylamine, 3-(N,N-dimethylaminopropyl)- aminopropylmethyldimethoxysilane, N-[3-(trimethoxysilyl) propyl]ethane-1,2-diamine (i.e., the compound characterized by Structure II); and the like, or combinations thereof.

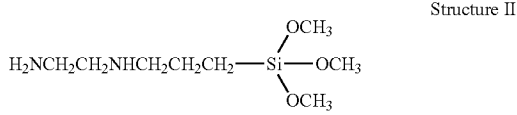

Structure II

The conditions necessary for the condensation reaction between an amine-based coupling agent precursor and a silane-based coupling agent precursor will be apparent to one of skill in the art, with the help of this disclosure.

Nonlimiting examples of amine-based coupling agent precursors suitable for use in the present disclosure include cyclo-aliphatic amines, 1,2-diaminocyclohexane, piperazine, aminoethylpiperazine, N-aminophenyl piperazine; aromatic amines, methylene dianiline; 4,4'-diaminodiphenyl sulfone; aliphatic amines, aliphatic tertiary amines, ethylene diamine, polyethyl amines, diethylene triamine, triethylene tetraamine, tetraethylene pentaamine; N-cocoalkyltrimethylenediamine, isophoronediamine, diethyltoluenediamine, 4,4'-diaminodiphenyl methane, tris(dimethylaminomethylphenol); heterocyclic amines; 2H-pyrrole, pyrrole; imidazole, 2-ethyl-4-methyl imidazole; pyrazole; pyrazine; pyridine; pyrimidine; pyridazine; indolizine, isoindole, 3H-indole, indole; 1H-indazole, indazole; purine; 4H-quinolizine, quinoline, isoquinoline, dihydroquinoline; phthalazine; naphthyridine; quinoxaline; quinazoline; 4H-carbazole, carbazole, β-carboline, phenanthridine, acridine, phenathroline; phenazine; imidazolidine; phenoxazine; cinnoline; pyrrolidine, pyrroline, imidazoline, indoline, isoindoline; quinuclindine; morpholine; azocine; azepine, 2H-azepine; 1,3,5-triazine; thiazole; pteridine; hexamethylene imine; amines, bis-amines, tris-amines; polyamines; amides; polyamides; amido amines; polyether amines; polyoxyalkylene amines; derivatives thereof, or combinations thereof. The term "derivative" is defined herein to include any compound that is made from one of the listed compounds, for example, by replacing one atom in the listed compound with another atom or group of atoms, rearranging two or more atoms in the listed compound, ionizing one of the listed compounds, or creating a salt of one of the listed compounds.

Nonlimiting examples of silane-based coupling agent precursors suitable for use in the present disclosure include silanes; vinyl silanes, vinyl silane, vinyltrichlorosilane, vinyltrimethoxysilane, vinyltriethoxysilane, vinyltris(2-methoxyethoxy)silane, vinyltrisisopropoxysilane, vinyl-tris (t-butylperoxy)silane, vinyldimethylchlorosilane, vinyldimethylethoxysilane, vinylmethyldichlorosilane, vinylmethyldimethoxysilane, vinylmethyldiethoxysilane, methylvinyldi(N-methyl-acetylamid)silane, methylvinyldi (5-caprolactam)silane, bis(methyldichlorosilyl)ethane, 2,4, 6,8-tetramethyl-2,4,6,8-tetravinyl-cyclotetrasiloxane, 1,3,5-trivinyl-1,3,5-trimethylcyclotrisiloxane; epoxy silanes, 3-glycidoxypropyltrimethoxysilane, 3-glycidoxypropyltriethoxysilane, 3-glycidoxypropylmethyldiethoxysilane, 3-glycidoxypropylmethyldimethoxysilane, 2-(3,4-epoxycyclohexyl)-ethyltrimethoxysilane, 2-(3,4-epoxycyclohexyl)-ethyltriethoxysilane; sulfur silanes; ureido silanes; isocyanate silanes; mercapto silanes; methacryloxy silanes; chloro silanes; alkyl silanes; alkoxy silanes; oximino silanes; acetoxy silanes; phenyl silanes; silazanes; siloxanes; silanols; derivatives thereof, or combinations thereof.

In an embodiment, the silane coupling agent of the type disclosed herein may be included within the WSF in a suitable or effective amount (e.g., an amount effective to consolidate at least a portion of a wellbore and/or subterranean formation). The resultant concentration and/or amount of silane coupling agent that is necessary may be dependent upon a variety of factors such as the composition of the aqueous base fluid; the presence or absence of various additives; the type of proppant used; the temperature of the operational environment (e.g., the wellbore); the composition of the formation, the pressure of the formation, the diameter of the hole, the particular resin material used, the particular silane coupling agent used, the expected contact time of the silane coupling agent with the resin material and/or the surface where it is intended for the silane coupling agent to couple/attach; or combinations thereof. In an embodiment, a silane coupling agent of the type disclosed herein may be present within the WSF in an amount of from about 0.0025 wt. % to about 10 wt. %, alternatively from about 0.025 wt. % to about 2 wt. %, or alternatively from about 0.1 wt. % to about 1 wt. %, based on the total weight of the WSF.

Aqueous base fluids that may be used in the WSF include any aqueous fluid suitable for use in subterranean applications, provided that the aqueous base fluid is compatible with the resin material and the silane coupling agent used in the WSF. For example, the WSF may comprise water or a brine. In an embodiment, the base fluid comprises an aqueous brine. In such an embodiment, the aqueous brine generally comprises water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, or combinations thereof. The salt or salts in the water may be present in an amount ranging from greater than about 0% by weight to a saturated salt solution, alternatively from about 0 wt. % to about 35 wt. %, alternatively from about 1 wt. % to about 30 wt. %, or alternatively from about 5 wt. % to about 10 wt. %, based on the weight of the salt solution. In an embodiment, the salt or salts in the water may be present within the base fluid in an amount sufficient to yield a saturated brine. In an embodiment, the aqueous base fluid may comprise the balance of the WSF after considering the amount of the other components used.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to: NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof. In an embodiment, the aqueous fluid comprises a brine.

The WSF may further comprise additional additives as deemed appropriate for improving the properties of the fluid. Such additives may vary depending on the intended use of the fluid in the wellbore. Examples of such additives include, but are not limited to, proppants, gravel, emulsifiers, lime, organic/inorganic viscosifiers, gelling agents, crosslinkers, weighting agents, glass fibers, carbon fibers, suspending agents, clays, clay control agents, fluid loss control additives, dispersants, flocculants, conditioning agents, dispersants, water softeners, acids, foaming agents, salts, oxidation inhibitors, scale inhibitors, thinners, scavengers, gas scavengers, lubricants, friction reducers, antifoam agents, bridging agents, bases, surfactants, mutual solvents, corrosion inhibitors, relative permeability modifiers, breaking agents, and the like, or combinations thereof. These additives may be introduced singularly or in combination using any suitable methodology and in amounts effective to produce the desired improvements in fluid properties. As will appreciated by one of skill in the art with the help of this disclosure, any of the components and/or additives used in the WSF have to be compatible with the resin material and the silane coupling agent used in the WSF composition.

In an embodiment, the WSF comprises a proppant. In an embodiment, the proppant may comprise any suitable particulate material, which may be used to prop fractures open, i.e., a propping agent or a proppant. As used herein, a proppant refers to a particulate material that is suitable for use in a proppant pack or a gravel pack. When deposited in a fracture, the proppant may form a proppant pack, resulting in conductive channels through which fluids may flow to the wellbore. The proppant functions to prevent the fractures from closing due to overburden pressures.

Nonlimiting examples of proppants suitable for use in this disclosure include silica (sand), graded sand, Ottawa sands, Brady sands, Colorado sands; resin-coated sands; gravels; synthetic organic particles, nylon pellets, high density plastics, teflons, polytetrafluoroethylenes, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other form of particleization; resin coated materials of the type described herein; or combinations thereof. In an embodiment, the proppant comprises sand.

The proppants may be of any suitable size and/or shape. In an embodiment, a proppant suitable for use in the present disclosure may have an average particle size in the range of from about 2 to about 400 mesh, alternatively from about 8 to about 100 mesh, or alternatively from about 10 to about 70 mesh, U.S. Sieve Series.

In an embodiment, a proppant may be present in the WSF in an amount of from about 0.1 pounds per gallon (ppg) to about 28 ppg, alternatively from about 0.1 ppg to about 14 ppg, or alternatively from about 0.1 ppg to about 8 ppg, based on the volume of the WSF.

In an embodiment, the WSF comprises a resin material, a silane coupling agent and an aqueous base fluid. For example, the WSF may comprise bisphenol A epoxide (i.e., the compound characterized by Structure I), N-[3-(trimethoxysilyl)propyl]ethane-1,2-diamine (i.e., the compound characterized by Structure II), and the balance comprises a KCl brine, based on the total weight of the WSF. In such an embodiment, the bisphenol A epoxide (i.e., the compound characterized by Structure I) may react with the N-[3-(trimethoxysilyl)propyl]ethane-1,2-diamine (i.e., the compound characterized by Structure II) to form an epoxy resin reaction product according to the reaction schematic displayed in FIG. 1. In the embodiment depicted in FIG. 1, the wavy lines present in the structure of the epoxy resin represent crosslinks that may form during the amine crosslinking with epoxy reaction that is shown in FIG. 1.

In an alternative embodiment, the WSF comprises a resin material, a silane coupling agent and an aqueous base fluid. For example, the WSF may comprises phenol/phenol formaldehyde/furfuryl alcohol resin, N-[3-(trimethoxysilyl)propyl]ethane-1,2-diamine (i.e., the compound characterized by Structure II), and the balance comprises a KCl brine, based on the total weight of the WSF. In such embodiment, the phenol/phenol formaldehyde/furfuryl alcohol resin comprises from about 5 wt. % to about 30 wt. % phenol, from about 40 wt. % to about 70 wt. % phenol formaldehyde, and from about 10 wt. % to about 40 wt. % furfuryl alcohol, based on the total weight of the phenol/phenol formaldehyde/furfuryl alcohol resin.

In an embodiment, the WSF composition comprising a resin material and a silane coupling agent may be prepared using any suitable method or process. The components of the WSF (e.g., resin material, silane coupling agent, aqueous base fluid, proppant, etc.) may be combined and mixed in by using any mixing device compatible with the composition, e.g., a mixer, a blender, etc.

A resin material and a silane coupling agent of the type disclosed herein may be included in any suitable wellbore servicing fluid (WSF). As used herein, a "servicing fluid" or "treatment fluid" refers generally to any fluid that may be used in a subterranean application in conjunction with a desired function and/or for a desired purpose, including but not limited to fluids used to complete, work over, fracture, repair, or in any way prepare a wellbore for the recovery of materials residing in a subterranean formation penetrated by the wellbore. Examples of wellbore servicing fluids include, but are not limited to, drilling fluids or muds, spacer fluids, lost circulation fluids, cement slurries, washing fluids, sweeping fluids, acidizing fluids, fracturing fluids, gravel packing fluids, diverting fluids, consolidation fluids, or completion fluids. The servicing fluid is for use in a wellbore that penetrates a subterranean formation. It is to be understood that "subterranean formation" encompasses both areas below exposed earth and areas below earth covered by water such as ocean or fresh water.

In an embodiment, the components of the WSF are combined at the well site. In an embodiment, proppants may be added to the WSF on-the-fly (e.g., in real time or on-location) along with the other components/additives. The resulting WSF may be pumped downhole where it may function as intended (e.g., consolidate at least a portion of a wellbore and/or subterranean formation).

In some embodiments, the WSF comprising a resin material and a silane coupling agent of the type disclosed herein may be used alone as a fracture propping material or may be optionally combined with one or more particulate materials (i.e., proppants such as sand). For example, a formation may be treated in a variety of sequences including: (i) a WSF comprising a resin material and a silane coupling agent of the type disclosed herein pumped into the formation followed by a WSF comprising proppant (e.g., sand); (ii) a WSF comprising proppant pumped into the formation followed by a WSF comprising a resin material and a silane coupling agent of the type disclosed herein; (iii) a WSF comprising a proppant, a resin material and a silane coupling agent of the type disclosed herein pumped concurrently into the formation; (iv) a WSF comprising a resin material of the type disclosed herein and a proppant (e.g., sand) pumped into the formation followed by a WSF comprising a silane coupling agent of the type disclosed herein; (v) a WSF comprising a silane coupling agent of the type disclosed herein pumped into the formation followed by a WSF comprising a resin material of the type disclosed herein and a proppant (e.g., sand); (vi) a WSF comprising a silane coupling agent of the type disclosed herein and a proppant (e.g., sand) pumped into the formation followed by a WSF comprising a resin material of the type disclosed herein; (vii) a WSF comprising a resin material of the type disclosed herein pumped into the formation followed by a WSF comprising a silane coupling agent of the type disclosed herein and a proppant (e.g., sand); or (viii) combinations thereof. As will be apparent to one of skill in the art, and with the help of this disclosure, based upon a particular sequence, the components of a WSF comprising a resin material and a silane coupling agent of the type disclosed herein may bond (e.g., couple/attach) sequentially and/or simultaneously with an appropriate substrate such as a proppant surface and/or a surface of a wellbore and/or subterranean formation (e.g., a fracture surface).

In various embodiments, the proppant (e.g., sand) may be pre-contacted and/or pre-coated with one or more components of the WSF (e.g., a resin material and/or a silane coupling agent of the type disclosed herein) prior to being placed into the wellbore, for example to form a coated sand (e.g., resin coated sand). In such embodiments, the proppant (e.g., sand) may be pre-contacted and/or pre-coated with one or more components of the WSF (e.g., a resin material and/or a silane coupling agent of the type disclosed herein) off-site, alternatively on-the-fly at a job site, or combinations thereof. When the proppant (e.g., sand) is pre-contacted and/or pre-coated with one or more components of the WSF (e.g., a resin material and/or a silane coupling agent of the type disclosed herein) off-site, such coated proppant may be transported to the well site where it may be contacted with the other components of the WSF (e.g., resin material, silane coupling agent, aqueous base fluid, etc.). WSF compositions comprising proppant, resin material, silane coupling agent, aqueous base fluid, and optional additives may be prepared using any suitable methodology. For example, the components (e.g., proppant, resin material, silane coupling agent, aqueous base fluid, etc.) may be mixed in a blender. In an embodiment, the proppant (e.g., sand) may be pre-contacted and/or pre-coated with a silane coupling agent of the type disclosed herein. In another embodiment, the proppant (e.g., sand) may be pre-contacted and/or pre-coated with a resin material of the type disclosed herein. In yet another embodiment, the proppant (e.g., sand) may be pre-contacted and/or pre-coated with a resin material and a silane coupling agent of the type disclosed herein.

In an embodiment, the WSF is an aqueous based fracturing fluid comprising a resin material, a silane coupling agent, a proppant, and an aqueous base fluid. In another embodiment, the WSF is an aqueous based gravel packing fluid comprising a resin material, a silane coupling agent, gravel, and an aqueous base fluid.

In an embodiment, the wellbore service being performed is a fracturing operation, wherein a WSF comprising a resin material and a silane coupling agent of the type disclosed herein is placed (e.g., pumped downhole) in the formation. Hydraulic fracturing, which is commonly referred to as fracturing, is a process used to increase the flow of desirable fluids, such as oil and gas, from a portion of a subterranean formation. Hydraulic fracturing operations generally involve introducing a fracturing fluid into a subterranean formation at a pressure sufficient to create or enhance one or more fractures in the formation. Enhancing a fracture includes enlarging a pre-existing fracture in the formation.

In an embodiment, the WSF is a fracturing fluid. As will be understood by one of ordinary skill in the art, the particular composition of a fracturing fluid will be dependent on the type of formation that is to be fractured. Fracturing fluids, in addition to a resin material and a silane coupling agent, typically comprise an aqueous fluid (e.g., water), a surfactant, a proppant, acid, friction reducers, gelling agents, scale inhibitors, pH-adjusting agents, oxygen scavengers, breakers, crosslinkers, iron-control agents, corrosion inhibitors, bactericides, and the like. In an embodiment, the fracturing fluid comprises a proppant.

In an embodiment, the WSF comprising a resin material and a silane coupling agent of the type disclosed herein, and the proppant are introduced into the wellbore in the same stream. In an alternative embodiment, components of the WSF are apportioned between separate flowpaths into the wellbore (e.g., split between an annular flowpath and a tubular flowpath formed by concentric wellbore tubulars) such that reaction between the components of the WSF (e.g., resin material, silane coupling agent) is delayed until such components come into contact and mix within the wellbore proximate to a zone or interval to be treated (e.g., fractured).

In an embodiment, the WSF comprising a resin material and a silane coupling agent of the type disclosed herein is introduced into the wellbore prior to, subsequent to, and/or simultaneously with the proppant being placed into the wellbore. In an alternative embodiment, the WSF comprising a resin material and a silane coupling agent of the type disclosed herein may be used to treat formation sand with the purpose of maintaining or supporting formation integrity, minimizing the formation of fines, and/or sand control in the formation, thereby consolidating at least a portion of the wellbore and/or subterranean formation.

In an embodiment, the wellbore service being performed is a gravel packing operation, wherein a WSF comprising a resin material and a silane coupling agent of the type disclosed herein is placed (e.g., pumped downhole) in the formation. In such embodiment, the WSF is a gravel packing fluid. A "gravel pack" is a term commonly used to refer to a volume of particulate materials (such as gravel and/or sand) placed into a wellbore to at least partially reduce the migration of unconsolidated formation particulates into the wellbore. Gravel packing operations commonly involve placing a gravel pack screen in the wellbore neighboring a desired portion of the subterranean formation, and packing the surrounding annulus between the screen and the subterranean formation with particulate materials that are sized to prevent and inhibit the passage of formation solids through the gravel pack with produced fluids. In some instances, a screenless gravel packing operation may be performed. In an embodiment, the gravel pack comprises a proppant material of the type previously described herein. Gravel packing is described in more detail in U.S. Pat. No. 8,183,186, which is incorporated by reference herein in its entirety.

In an embodiment, the contacting of the components of the WSF (e.g., resin material, silane coupling agent) with the proppant, wellbore and/or subterranean formation may initiate the coupling of the resin material onto the proppant surface and/or the surface of the wellbore and/or subterranean formation (e.g., fracture surface). In an embodiment, the coupling of the resin material onto the proppant surface and/or the surface of the wellbore and/or subterranean formation (e.g., fracture surface) may be influenced by the ambient downhole environment to which the WSF (e.g., resin material, silane coupling agent) is subjected (e.g., temperature, presence of moisture, oxygen, microorganisms, enzymes, pH, pressure, and the like, or combinations thereof). In an embodiment, the WSF comprising a resin material and a silane coupling agent of the type disclosed herein may be used in wellbores having bottom hole temperatures (BHTs) in the range of from about 100° F. to about 450° F., alternatively from about 120° F. to about 350° F., or alternatively from about 150° F. to about 300° F.

In an embodiment, the WSF comprising a resin material and a silane coupling agent of the type disclosed herein may be used in wellbores where drawdown pressure is exceeded by the strength of a consolidated proppant, such as for example a proppant that has been contacted with a resin material and a silane coupling agent of the type disclosed herein, wherein the resin material and the silane coupling agent have hardened onto the proppant. The drawdown pressure of a wellbore refers to a differential pressure that drives fluids (e.g. oil or gas) from the reservoir (e.g., a location where the natural resources such as oil or gas reside prior to their recovery/extraction) into the wellbore.

In an embodiment, a WSF comprising a resin material and a silane coupling agent of the type disclosed herein, upon hardening, may have an unconfined compressive strength (UCS) in the range of from about 5 psi to about 5000 psi, alternatively from about 50 psi to about 3000 psi, or alternatively from about 100 psi to about 1000 psi. Without wishing to be limited by theory, the UCS can be defined as the compressive strength of a material that is cohesive enough to undergo compression testing without confining the sample to be tested (e.g., unconfined compression testing). Further, without wishing to be limited by theory, the compressive strength of a material can be defined as the maximum capacity of a material or structure to withstand axially directed pushing forces before the structural integrity of the material is compromised (e.g., falling apart, crumbling, etc.).

In an embodiment, after introduction of one or more of the components of the WSF (e.g., resin material, silane coupling agent) to the formation during any suitable treatment sequence as previously described herein, the well may be shut-in for some period of time to afford the silane coupling agent sufficient time to react with the resin material, the proppant surface and/or the surface of the wellbore and/or subterranean formation (e.g., fracture surface). In an embodiment, the well may be shut-in for a time period in the range of from about 1 hour to about 336 hrs, alternatively from about 1 hrs to about 168 hrs, alternatively from about 4 hrs to about 72 hrs, or alternatively from about 8 hrs to about 48 hrs. As will be understood by one of ordinary skill in the art, and with the help of this disclosure, during the shut-in time period, the resin material may couple to a desired surface (e.g., a proppant surface, a surface of the wellbore and/or subterranean formation, a fracture surface) and harden, thereby consolidating at least a portion of a wellbore and/or subterranean formation.

In an embodiment, the silane coupling agent may couple to any suitable substrate (e.g., a proppant surface, a surface of the wellbore and/or subterranean formation, a fracture surface) by undergoing a hydrolysis of the silyl ether functional groups of the silane coupling agent and a condensation of the resulting silanol with the substrate (e.g., a proppant surface, a surface of the wellbore and/or subterranean formation, a fracture surface). Without wishing to be limited by theory, a silyl ether functional group contains a silicon atom covalently bonded to an alkoxy group (e.g., Si—OR' where R' is any suitable alkyl or aryl substituent), and a silanol contains a silicon atom covalently bonded to a hydroxyl group (e.g., Si—OH). The silyl ether functional groups of the silane coupling agent may undergo hydrolysis in the presence of water, whether such water is endogenous to the subterranean formation (e.g., formation water) or it is introduced as part of a wellbore servicing fluid (e.g., an aqueous base fluid, a brine, etc.). In an embodiment, the silane coupling agent may couple/attach (e.g., bond) to any suitable substrate (e.g., a proppant surface, a surface of the wellbore and/or subterranean formation, a fracture surface) prior to, subsequent to, and/or simultaneous with attaching the silane coupling agent to the resin material of the type disclosed herein.

Figure 2:
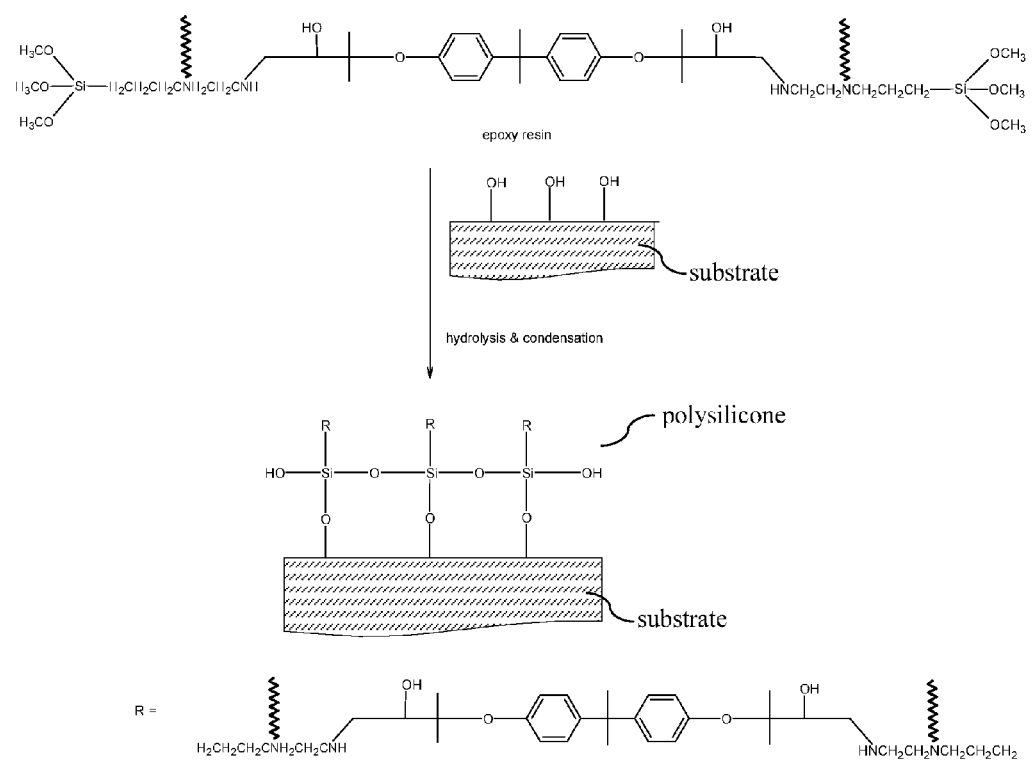
FIG. 2 is a schematic representation of coupling a resin to a substrate.

In an embodiment, the substrate (e.g., a proppant surface, a surface of the wellbore and/or subterranean formation, a fracture surface) comprises hydroxyl functional groups (e.g., —OH). In an embodiment, the hydrolysis and condensation reaction of the silane coupling agent with the hydroxyl functional groups (e.g., —OH) of the substrate (e.g., a proppant surface, a surface of the wellbore and/or subterranean formation, a fracture surface) may result in the assembling of a polysilicone on such substrate (e.g., a proppant surface, a surface of the wellbore and/or subterranean formation, a fracture surface), as shown in the embodiment of FIG. 2. The R groups of the polysilicone depicted in FIG. 2 comprise a silane coupling agent of the type disclosed herein, a silane coupling agent of the type disclosed herein attached to a resin material of the type disclosed herein (e.g., epoxy resin depicted in FIG. 2), or combinations thereof. In an embodiment, the R groups of the polysilicone depicted in FIG. 2 may have the structure shown in FIG. 2, where the wavy lines present in the structure of R represent crosslinks that may form during a reaction between the silane coupling agent and a resin material, such as for example an amine crosslinking with epoxy reaction that is shown in FIG. 1. The R groups of the polysilicone may be the same or different, and they may be covalently bonded to each other. In an embodiment, the R group comprises two or more Si atoms, and each of the Si atoms may contribute to the formation of the polysilicone.

In an embodiment, the WSF comprising a resin material and a silane coupling agent and methods of using the same disclosed herein may be advantageously employed as a servicing fluid in the performance of one or more wellbore servicing operations. For example, when utilizing a WSF comprising a resin material and a silane coupling agent of the type disclosed herein, there is no need for using a separate/distinct hardening agent, therefore providing a simpler resin system for consolidating at least a portion of a wellbore and/or subterranean formation. Conventional resin systems for wellbore applications are generally designed to include at least three distinct components (e.g., a resin, a coupling agent, and a hardening agent). In an embodiment, the WSF is substantially free of a hardening agent (e.g., a third, hardening component of a resin system), for example comprises less than 1.0, 0.1, 0.01, or 0.001 weight percent of a conventional hardening agent. In an embodiment, the WSF comprises a resin system and an aqueous base fluid, wherein the resin system consists or consists essentially of a resin material and a silane coupling agent. In an embodiment, the resin system is substantially free of a hardening agent (e.g., a third, hardening component of a resin system), for example comprises less than 1.0, 0.1, 0.01, or 0.001 weight percent of a conventional hardening agent. In an embodiment, consisting essentially of excludes a material amount of other ingredients that would affect the basic characteristics, properties, and/or function of the material, but does not exclude minor, trivial, and/or trace amounts of other ingredients.

In an embodiment, the use of a WSF comprising a resin material and a silane coupling agent of the type disclosed herein may advantageously provide for more ease of operation when compared to conventional resin systems. In an embodiment, a silane coupling agent of the type disclosed herein has advantageously a dual functionality, both as an anchoring agent onto any suitable substrate (e.g., a proppant surface, a surface of the wellbore and/or subterranean formation, a fracture surface), and as a hardening agent.

In an embodiment, the assembling of the polysilicone on a substrate (e.g., a proppant surface, a surface of the wellbore and/or subterranean formation, a fracture surface) may advantageously lead to a hybrid polysilicone-resin system. In an embodiment, such hybrid polysilicone-resin system may advantageously have an increased thermal stability when compared to conventional resin systems. The hybrid polysilicone-resin system may be stable at BHTs of up to about 350° C.

In an embodiment, the hybrid polysilicone-resin system may advantageously have an increased elasticity when compared to conventional resin systems. Without wishing to be limited by theory, the elasticity of a material can be defined as the ability of such material to return to the original shape upon deformation. In an embodiment, the hybrid polysilicone-resin system owes its increased elasticity to the polysilicone component. In an embodiment, the WSF advantageously comprises an increased amount of a silane coupling agent when compared to conventional resin systems. For example, if a conventional resin system comprises an x amount of a coupling agent (e.g., a silane), the WSF of the type disclosed herein may comprise about 50x amount of a silane coupling agent of the type disclosed herein, alternatively about 100x, alternatively about 200x, alternatively about 500x, or alternatively about 1000x.

In an embodiment, the hybrid polysilicone-resin system may advantageously have an increased extension ratio when compared to conventional resin systems. Without wishing to be limited by theory, the extension ratio of a material can be defined as the ratio between the final length and the initial length during an elastic deformation process. For example, if a conventional resin system has an extension ratio of y, the WSF comprising a resin material and a silane coupling agent of the type disclosed herein may have an extension ratio of about 1.1y, alternatively about 1.2y, alternatively about 1.5y, or alternatively about 2y.

In an embodiment, the hybrid polysilicone-resin system may advantageously be more resilient to stress cycles that are usually encountered in a wellbore environment (e.g., cyclical changes in temperature, cyclical changes in pressure, etc.) when compared to conventional resin systems. Additional advantages of the WSF system and/or the methods of using the same may be apparent to one of skill in the art viewing this disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The mechanical properties of samples comprising a resin material and a silane coupling agent of the type disclosed herein were investigated. More specifically, the unconfined compressive strength (UCS) of resin-coated sand samples was investigated by unconfined compression testing. 4 parts by weight of bisphenol A epoxide (i.e., the compound characterized by Structure I) were mixed with 1 part by weight of N-[3-(trimethoxysilyl)propyl]ethane-1,2-diamine (i.e., the compound characterized by Structure II) and the mixture was used for coating 20/40 Brady sands (e.g., Brady sands with a particle size between 20 mesh and 40 mesh, U.S. Sieve Series). 100 mL of water were used for solvent extraction from the resin-coated sand by rinsing it twice. 100 g of the resin-coated sand was packed into a 60 mL syringe, and the plunger was used for applying a minimal pressure to the sand, to ensure that the sand was uniformly packed into a 12.7 cm (5 inch) long column having an inner diameter of 2.54 cm (1 inch). The column containing the resin-coated sand was then placed into an oven and kept at 210° F. for 48 hrs to complete the curing of the resin coating the sand into a hardened resinous mass. The hardened resinous mass was sliced into a 2.54 cm×5.08 cm (1 inch×2 inch) samples and these samples were tested for their unconfined compressive strength (UCS) measurement using an Instron 5550. UCS for this hardened resinous mass (e.g., consolidated sand pack) was measured to be 298 psi.

Additional Disclosure

A first embodiment, which is a method of servicing a wellbore in a subterranean formation comprising preparing a wellbore servicing fluid comprising a resin material, a silane coupling agent, and an aqueous base fluid, placing the wellbore servicing fluid in the wellbore and/or subterranean formation, and allowing the wellbore servicing fluid to harden therein.

A second embodiment, which is the method of the first embodiment wherein the resin material comprises organic resins, epoxy-based resins, polyepoxide resins, cycloaliphatic epoxides, bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate, 3,4-epoxycyclohexylmethyl-3,4-epoxycyclohexane carboxylate, 3,4-epoxy-1-methylcyclohexylmethyl-3,4-epoxycyclohexane carboxylate, 3,4-epoxy-1-methylcyclohexylmethyl-3,4-epoxy-1-methylcyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, 2-(3,4-epoxycyclohexyl-5,5-spiro-3,4-epoxy)cyclohexane-meta-dioxane, glycidyl epoxides, aliphatic epoxides, epoxy cresol novolac resins, epoxy phenol novolac resins, polynuclear phenol glycidyl ether-derived resins, aromatic glycidyl amine resins, heterocyclic glycidyl amine resins, hydantoin epoxy resins, natural oils epoxides, soybean oil epoxides, linseed oil epoxides, bisphenol A diglycidyl ether resin, butoxymethyl butyl glycidyl ether resin, bisphenol A-epichlorohydrin resin, bisphenol F resin, bisphenol epoxy resin, phenolic resins, phenolic/latex resins, terpolymers of phenol, phenol-aldehyde resins, novolac resins, phenolic formaldehyde resin, urea-aldehyde resin, urea-formaldehyde resin, melamine-formaldehyde resin, furan resins, furan/formaldehyde resin, furfuryl alcohol resins, furfuryl alcohol/formaldehyde resin, phenol/phenol formaldehyde/furfuryl alcohol resin, bisphenol A epoxide (i.e., the compound characterized by Structure I), and the like, or combinations thereof.

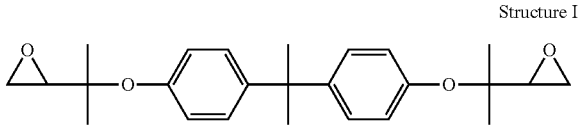

Structure I

A third embodiment, which is the method of one of the first through second embodiments wherein the resin material further comprises a solvent.

A fourth embodiment, which is the method of third embodiment wherein the solvent comprises aqueous dissolvable solvents, methanol, isopropanol, butanol, butyl lactate, butyl acetate, glycol ether solvents, dipropylene glycol methyl ether, dipropylene glycol dimethyl ether, diethylene glycol methyl ether, ethyleneglycol butyl ether, diethyleneglycol butyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, dimethyl formamide, propylene carbonate, D-limonene, furfuryl acetate, tetrahydrofurfuryl methacrylate, tetrahydrofurfuryl acrylate, esters of oxalic, maleic and succinic acids, fatty acid methyl esters, butylglycidyl ether, isomers thereof, and the like, or combinations thereof.

A fifth embodiment, which is the method of one of the first through fourth embodiments wherein the resin material is present in the wellbore servicing fluid in an amount of from about 0.01 wt. % to about 10 wt. % based on the total weight of the wellbore servicing fluid.

A sixth embodiment, which is the method of one of the first through fifth embodiments wherein the silane coupling agent comprises the product of a condensation reaction between an amine-based coupling agent precursor and a silane-based coupling agent precursor; an amino silane, N-(3-triethoxysilylpropyl)amine, 3-aminopropylsilanetriol, bis[(3-triethoxysilyl)propyl]-amine, N-(3-trimethoxysilylpropyl)amine, bis[(3-trimethoxysilyl)propyl]amine, N-(3-methyl-dimethoxysilylpropyl)amine, 3-methyldimethoxysilylpropylamine, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(3-trimethoxysilylpropyl)diethylenetriamine, N-(3-methyldimethoxysilylpropyl)diethylenetriamine, methyldimethoxysilylpropylpiperazine, N-3-(trimethoxysilyl)-propylcyclohexylamine, N-3-(methyldimethoxysilyl)-propylcyclohexylamine, N-(trimethoxysilylmethyl)aniline, N-(triethoxysilylmethyl)aniline, N-(3-trimethoxysilylpropyl)-aniline, N-(3-triethoxysilylpropyl)aniline, diethylaminomethyltriethoxysilane, diethylaminomethylmethyldiethoxysilane, 3-(trimethoxysilylpropyl)diethylamine, 3-(N,N-dimethyl-aminopropyl)-aminopropylmethyldimethoxysilane, N-[3-(trimethoxysilyl) propyl]ethane-1,2-diamine (i.e., the compound characterized by Structure II); and the like, or combinations thereof.

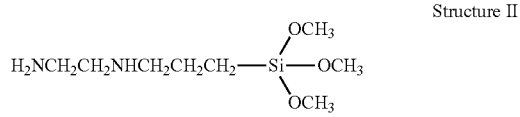

Structure II

A seventh embodiment, which is the method of the sixth embodiment wherein the amine-based coupling agent precursor comprises cyclo-aliphatic amines, 1,2-diaminocyclohexane, piperazine, aminoethylpiperazine, N-aminophenyl piperazine; aromatic amines, methylene dianiline; 4,4'-diaminodiphenyl sulfone; aliphatic amines, aliphatic tertiary amines, ethylene diamine, polyethyl amines, diethylene triamine, triethylene tetraamine, tetraethylene pentaamine; N-cocoalkyltrimethylenediamine, isophoronediamine, diethyltoluenediamine, 4,4'-diaminodiphenyl methane, tris (dimethylaminomethylphenol); heterocyclic amines; 2H-pyrrole, pyrrole; imidazole, 2-ethyl-4-methyl imidazole; pyrazole; pyrazine; pyridine; pyrimidine; pyridazine; indolizine, isoindole, 3H-indole, indole; 1H-indazole, indazole; purine; 4H-quinolizine, quinoline, isoquinoline, dihydroquinoline; phthalazine; naphthyridine; quinoxaline; quinazoline; 4H-carbazole, carbazole, β-carboline, phenanthridine, acridine, phenathroline; phenazine; imidazolidine; phenoxazine; cinnoline; pyrrolidine, pyrroline, imidazoline; indoline, isoindoline; quinuclindine; morpholine; azocine; azepine, 2H-azepine; 1,3,5-triazine; thiazole; pteridine; hexamethylene imine; amines, bis-amines, tris-amines; polyamines; amides; polyamides; amido amines; polyether amines; polyoxyalkylene amines; derivatives thereof, or combinations thereof.

An eighth embodiment, which is the method of the sixth embodiment wherein the silane-based coupling agent precursor comprises silanes; vinyl silanes, vinyl silane, vinyltrichlorosilane, vinyltrimethoxysilane, vinyltriethoxysilane, vinyltris(2-methoxyethoxy)silane, vinyltrisisopropoxysilane, vinyltris(t-butylperoxy)silane, vinyldimethylchlorosilane, vinyldimethylethoxysilane, vinylmethyldichlorosilane, vinylmethyldimethoxysilane, vinylmethyldiethoxysilane, methylvinyldi(N-methylacetylamid)silane, methylvinyldi (5-caprolactam)silane, bis(methyldichlorosilyl)ethane, 2,4, 6,8-tetramethyl-2,4,6,8-tetravinyl-cyclotetrasiloxane, 1,3,5-trivinyl-1,3,5-trimethylcyclotrisiloxane; epoxy silanes, 3-glycidoxypropyltrimethoxysilane, 3-glycidoxypropyltriethoxysilane, 3-glycidoxypropylmethyldiethoxysilane, 3-glycidoxypropylmethyldimethoxysilane, 2-(3,4-epoxycyclohexyl)-ethyltrimethoxysilane, 2-(3,4-epoxycyclohexyl)-ethyltriethoxysilane; sulfur silanes; ureido silanes; isocyanate silanes; mercapto silanes; methacryloxy silanes; chloro silanes; alkyl silanes; alkoxy silanes; oximino silanes; acetoxy silanes; phenyl silanes; silazanes; siloxanes; silanols; derivatives thereof, or combinations thereof.

A ninth embodiment, which is the method of one of the first through eighth embodiments wherein the silane coupling agent is present in the wellbore servicing fluid in an amount of from about 0.0025 wt. % to about 10 wt. % based on the total weight of the wellbore servicing fluid.

A tenth embodiment, which is the method of one of the first through ninth embodiments wherein the aqueous base fluid comprises a brine.

An eleventh embodiment, which is the method of one of the first through tenth embodiments wherein the wellbore servicing fluid comprises a fracturing fluid or a gravel packing fluid.

A twelfth embodiment, which is the method of one of the first through eleventh embodiments wherein the wellbore servicing fluid further comprises particulate material.

A thirteenth embodiment, which is the method of the twelfth embodiment wherein the particulate material is pre-contacted with the resin material and/or the silane coupling agent.

A fourteenth embodiment which is a method of servicing a wellbore in a subterranean formation comprising preparing a wellbore servicing fluid comprising a resin material, a silane coupling agent, and an aqueous base fluid, wherein the resin material comprises an epoxy-based resin, the silane coupling agent comprises an amino silane, and the aqueous base fluid comprises a brine, placing the wellbore servicing fluid in the wellbore and/or subterranean formation, and allowing the wellbore servicing fluid to harden therein, thereby forming a hybrid polysilicone-resin system.

A fifteenth embodiment, which is the method of the fourteenth embodiment wherein the epoxy-based resin comprises bisphenol A epoxide (i.e., the compound characterized by Structure I).

Structure I

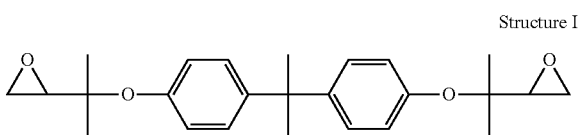

A sixteenth embodiment, which is the method of one of the fourteenth through fifteenth embodiments wherein the amino silane comprises N-[3-(trimethoxysilyl)propyl]ethane-1,2-diamine (i.e., the compound characterized by Structure II).

Structure II

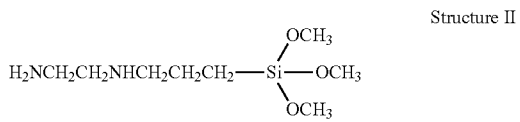

A seventeenth embodiment, which is the method of one of the fourteenth through sixteenth embodiments wherein the resin material further comprises a solvent.

An eighteenth embodiment, which is the method of one of the fourteenth through seventeenth embodiments wherein the wellbore servicing fluid comprises a fracturing fluid comprising sand.

A nineteenth embodiment, which is a method of servicing a wellbore in a subterranean formation comprising preparing a wellbore servicing fluid comprising a resin system, an aqueous base fluid, and a particulate material, wherein the resin system consists essentially of a resin material and a silane coupling agent, and placing the wellbore servicing fluid in the wellbore and/or subterranean formation.

A twentieth embodiment, which is the method of the nineteenth embodiment wherein the resin system is a hybrid polysilicone-resin system.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
preparing a wellbore servicing fluid comprising a resin material comprising bisphenol A epoxide (i.e., the compound characterized by Structure I), a silane coupling agent, and an aqueous base fluid;
placing the wellbore servicing fluid in the wellbore and/or subterranean formation; and
allowing the wellbore servicing fluid to harden therein Structure I

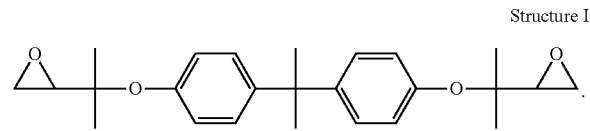

2. The method of claim 1 wherein the resin material further comprises a solvent.

3. The method of claim 2 wherein the solvent comprises aqueous dissolvable solvents, methanol, isopropanol, butanol, butyl lactate, butyl acetate, glycol ether solvents, dipropylene glycol methyl ether, dipropylene glycol dimethyl ether, diethylene glycol methyl ether, ethyleneglycol butyl ether, diethyleneglycol butyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, dimethyl formamide, propylene carbonate, D-limonene, furfuryl acetate, tetrahydrofurfuryl methacrylate, tetrahydrofurfuryl acrylate, esters of oxalic, maleic and succinic acids, fatty acid methyl esters, butylglycidyl ether, isomers thereof, and the like, or combinations thereof.

4. The method of claim 1 wherein the resin material is present in the wellbore servicing fluid in an amount of from about 0.01 wt. % to about 10 wt. % based on the total weight of the wellbore servicing fluid.

5. The method of claim 1 wherein the silane coupling agent comprises the product of a condensation reaction between an amine-based coupling agent precursor and a silane-based coupling agent precursor; an amino silane, N-(3-triethoxysilylpropyl)amine, 3-aminopropylsilanetriol, bis[(3-triethoxysilyl)propyl]amine, N-(3-trimethoxysilylpropyl)amine, bis[(3-trimethoxysilyl)propyl]amine, N-(3-methyldimethoxysilylpropyl)amine, 3-methyldimethoxysilylpropylamine, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(3-trimethoxysilylpropyl)diethylenetriamine, N-(3-methyldimethoxysilylpropyl)diethylenetriamine, methyldimethoxysilylpropylpiperazine, N-3-(trimethoxysilyl)-propylcyclohexylamine, N-3-(methyldimethoxysilyl)-propylcyclohexylamine, N-(trimethoxysilylmethyl)aniline, N-(triethoxysilylmethyl)aniline, N-(3-trimethoxysilylpropyl)aniline, N-(3-triethoxysilylpropyl)-aniline, diethylaminomethyltriethoxysilane, diethylaminomethylmethyldiethoxysilane, 3-(trimethoxysilylpropyl)diethylamine, 3-(N,N-dimethylaminopropyl)-aminopropylmethyldimethoxysilane, N-[3-(trimethoxysilyl)propyl]ethane-1,2-diamine (i.e., the compound characterized by Structure II); and the like, or combinations thereof

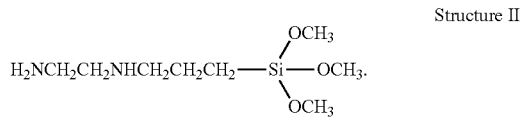

Structure II

6. The method of claim 5 wherein the amine-based coupling agent precursor comprises cyclo-aliphatic amines, 1,2-diaminocyclohexane, piperazine, aminoethylpiperazine, N-aminophenyl piperazine; aromatic amines, methylene dianiline; 4,4'-diaminodiphenyl sulfone; aliphatic amines, aliphatic tertiary amines, ethylene diamine, polyethyl amines, diethylene triamine, triethylene tetraamine, tetraethylene pentaamine; N-cocoalkyltrimethylenediamine, isophoronediamine, diethyltoluenediamine, 4,4'-diaminodiphenyl methane, tris(dimethylaminomethylphenol); heterocyclic amines; 2H-pyrrole, pyrrole; imidazole, 2-ethyl-4-methyl imidazole; pyrazole; pyrazine; pyridine; pyrimidine; pyridazine; indolizine, isoindole, 3H-indole, indole; 1H-indazole, indazole; purine; 4H-quinolizine, quinoline, isoquinoline, dihydroquinoline; phthalazine; naphthyridine; quinoxaline; quinazoline; 4H-carbazole, carbazole, β-carboline, phenanthridine, acridine, phenathroline; phenazine; imidazolidine; phenoxazine; cinnoline; pyrrolidine, pyrroline, imidazoline; indoline, isoindoline; quinuclindine; morpholine; azocine; azepine, 2H-azepine; 1,3,5-triazine; thiazole; pteridine; hexamethylene imine; amines, bis-amines, tris-amines; polyamines; amides; polyamides; amido amines; polyether amines;
polyoxyalkylene amines; derivatives thereof, or combinations thereof.

7. The method of claim 5 wherein the silane-based coupling agent precursor comprises silanes; vinyl silanes, vinyl silane, vinyltrichlorosilane, vinyltrimethoxysilane, vinyltriethoxysilane, vinyltris(2-methoxyethoxy)silane, vinyltrisisopropoxysilane, vinyltris(t-butylperoxy)silane, vinyldimethylchlorosilane, vinyldimethylethoxysilane, vinylmethyldichlorosilane, vinylmethyldimethoxysilane, vinylmethyldiethoxysilane, methylvinyldi(N-methyl-acetylamid)silane, methylvinyldi(5-caprolactam)silane, bis(methyldichlorosilyl)ethane, 2,4,6,8-tetramethyl-2,4,6,8-tetravinyl-cyclotetrasiloxane, 1,3,5-trivinyl-1,3,5-trimethylcyclotrisiloxane; epoxy silanes, 3-glycidoxypropyltrimethoxysilane, 3-glycidoxypropyltriethoxysilane, 3-glycidoxypropylmethyldiethoxysilane, 3-glycidoxypropylmethyldimethoxysilane, 2-(3,4-epoxycyclohexyl)-ethyltrimethoxysilane, 2-(3,4-epoxycyclohexyl)-ethyltriethoxysilane; sulfur silanes; ureido silanes; isocyanate silanes; mercapto silanes; methacryloxy silanes; chloro silanes; alkyl silanes; alkoxy silanes; oximino silanes; acetoxy silanes; phenyl silanes; silazanes; siloxanes; silanols; derivatives thereof, or combinations thereof.

8. The method of claim 1 wherein the silane coupling agent is present in the wellbore servicing fluid in an amount of from about 0.0025 wt. % to about 10 wt. % based on the total weight of the wellbore servicing fluid.

9. The method of claim 1 wherein the aqueous base fluid comprises a brine.

10. The method of claim 1 wherein the wellbore servicing fluid comprises a fracturing fluid or a gravel packing fluid.

11. The method of any of claim 10 wherein the wellbore servicing fluid further comprises particulate material.

12. The method of claim 11 wherein the particulate material is pre-contacted with the resin material and/or the silane coupling agent.

13. A method of servicing a wellbore in a subterranean formation comprising:
preparing a wellbore servicing fluid comprising a resin material, a silane coupling agent comprising N-[3-(trimethoxy¬silyl)¬propyl]¬ethane-1,2-diamine (i.e., the compound characterized by Structure II), and an aqueous base fluid, wherein the resin material comprises an epoxy-based resin, and the aqueous base fluid comprises a brine;
placing the wellbore servicing fluid in the wellbore and/or subterranean formation; and
allowing the wellbore servicing fluid to harden therein, thereby forming a hybrid polysilicone-resin system

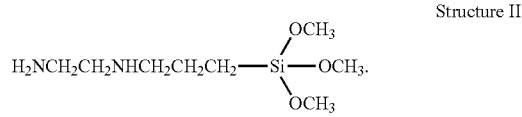

Structure II

14. The method of claim 13 wherein the epoxy-based resin comprises bisphenol A epoxide (i.e., the compound characterized by Structure I)

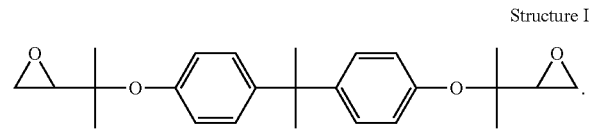 [SMILES: CC(C)(c1ccc(OC(C)(C)C2CO2)cc1)c1ccc(OC(C)(C)C2CO2)cc1]

Structure I

15. The method of any of claim 13 wherein the resin material further comprises a solvent.

16. The method of any of claim 13 wherein the wellbore servicing fluid comprises a fracturing fluid comprising sand.

17. A method of servicing a wellbore in a subterranean formation comprising:
    preparing a wellbore servicing fluid comprising a resin system, an aqueous base fluid, and a particulate material, wherein the resin system consists essentially of a resin material and a silane coupling agent; and
    placing the wellbore servicing fluid in the wellbore and/or subterranean formation.

18. The method of claim 17 wherein the resin system is a hybrid polysilicone-resin system.

* * * * *